June 9, 1925.
R. B. ELISON
KITCHEN FURNITURE
Original Filed July 18, 1923
1,541,692
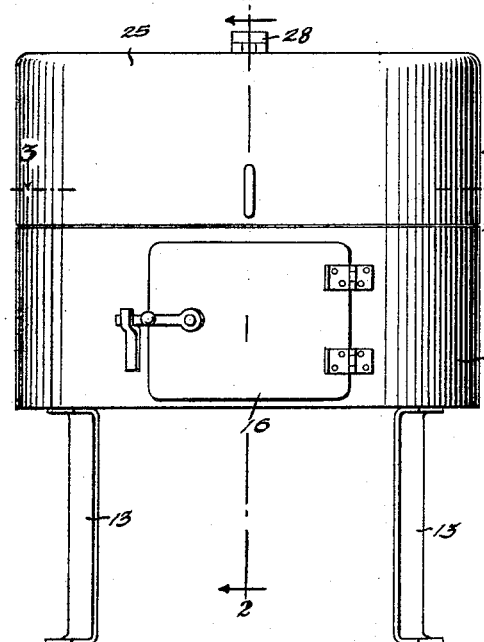
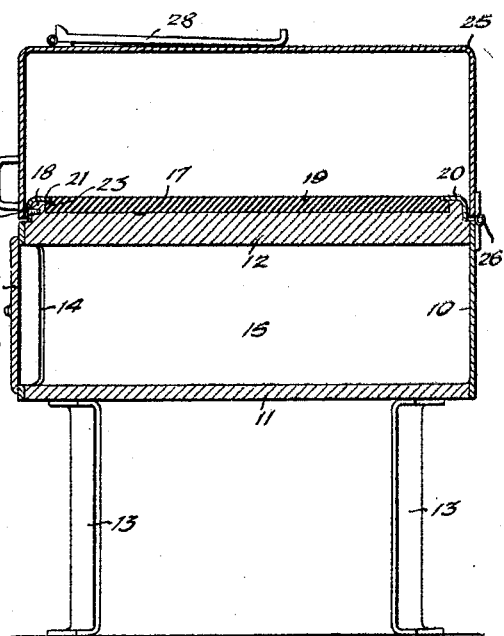
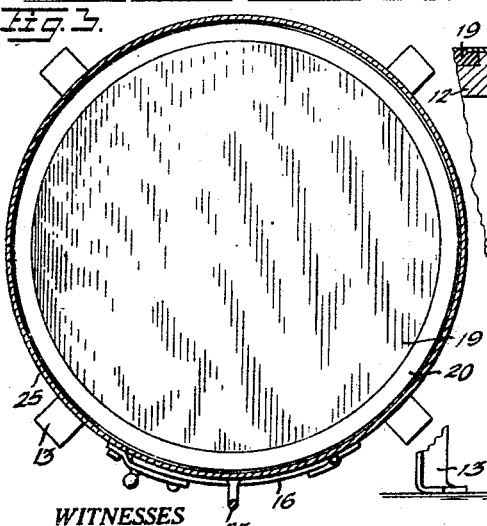
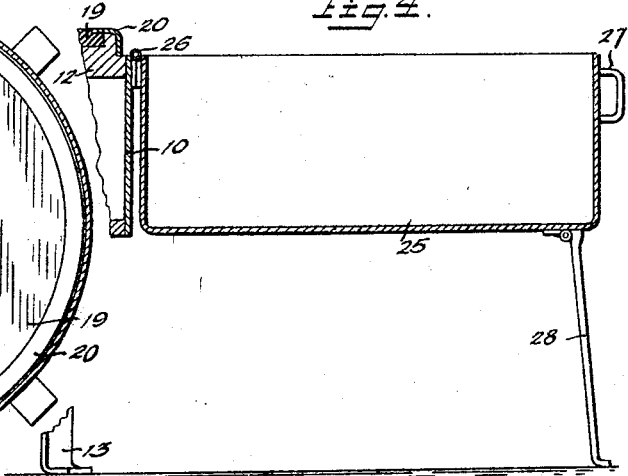
INVENTOR
R. B. ELISON
WITNESSES
ATTORNEYS Patented June 9, 1925.

1,541,692

UNITED STATES PATENT OFFICE.

ROBERT B. ELISON, OF ROEBLING, NEW JERSEY, ASSIGNOR OF ONE-HALF TO LEWIS W. WILLIAMS, OF ROEBLING, NEW JERSEY.

KITCHEN FURNITURE.

Application filed July 18, 1923, Serial No. 652,446. Renewed April 22, 1925.

*To all whom it may concern:*

Be it known that I, ROBERT B. ELISON, a citizen of the United States, and a resident of Roebling, in the county of Burlington and State of New Jersey, have invented new and Improved Kitchen Furniture, of which the following is a full, clear, and exact description.

This invention has relation to kitchen furniture and has particular reference to a combined article of furniture for various domestic uses.

The principal object of the present invention resides in the provision of an article of furniture which affords a crushing and chopping block for beefsteak, meats, vegetables or the like which is so constructed as to eliminate to a great extent the noise incident to the crushing or chopping operations.

The invention further contemplates an article of furniture which affords a surface for the rolling of dough in the making of bread, cakes, pies or the like.

As a further object the invention contemplates an article of furniture which may be used as a storage cabinet or refrigerator and which is provided with a cover constituting when opened a liquid receptacle.

As a still further object the invention aims to provide a combined article of kitchen furniture which is simple in its construction, inexpensive to manufacture and which is highly efficient in its purpose.

With the above recited and other objects in view the invention resides in the novel construction set forth in the following specification, particularly pointed out in the appended claims and illustrated in the accompanying drawing, it being understood that the right is reserved to embodiments other than those actually illustrated herein to the full extent indicated by the general meaning of the terms in which the claims are expressed.

In the drawing—

Figure 1 is a front view of an article of furniture constructed in accordance with the invention, illustrating the same in closed condition.

Fig. 2 is a vertical sectional view therethrough taken approximately on the line 2—2 of Fig. 1.

Fig. 3 is a horizontal sectional view taken approximately on the line 3—3 of Fig. 1.

Fig. 4 is a fragmentary vertical sectional view similar to Fig. 2 with the cover in opened position.

Referring to the drawing by characters of reference, the device includes a body consisting of a substantially cylindrical wall 10 preferably constructed of metal having a bottom 11 closing its lower end and a top wall 12 closing its upper end. The bottom is provided with a plurality of depending supporting legs 13 and the cylindrical wall 10 is provided with an opening 14 by means of which access is gained to the storage space 15 defined by the walls 10, 11 and 12. A suitable hinged door 16 is provided for closing the opening 14. The upper wall 12 fits within the upper end of the cylindrical wall 10 and said wall 12 has an upwardly projecting portion of reduced diameter which is centrally recessed as at 17 to provide an upstanding annular bead 18. A pad 19 preferably of rubber is positioned within the recess 17 to provide a chopping or crushing surface which is of sufficient resiliency to deaden the noise incident to the crushing, pounding or chopping operation. The pad 19 is retained in the recess by means of an annulus or ring 20 which is provided with horizontal and vertical flanges 21 and 22, the former lying over the upper end of the bead 18 and extending into a rabbet 23 in the pad 19, while the latter embraces or telescopes the reduced upper portion of the upper wall 12. Screws or other fastening devices 24 extend through the flange 22 and are anchored into the upper wall 12. Under this arrangement when the pad 19 is worn to a point where it is unfit for further use, the same may be replaced by removing the screws or fastening elements 24 and the ring or annulus 20. The outer periphery of the flange 22 of the ring or annulus 20 is of slightly less diameter than the outer periphery of the cylindrical wall 10 and a cover 25 of inverted cup-shape is hingedly connected as at 26 to the upper edge of the wall 10 at the rear thereof. The cover is thus arranged for closure over the upper reduced end of the upper wall 12 whereby the pad 19 is protected against the settlement of dust or dirt thereon when not in use. The cover is provided with a manipulating handle 27 and is also formed with a collapsible or hinged supporting leg 28 which serves to support the same in a horizontal position when opened whereby said cover constitutes a liquid receptacle contiguous to the body of the device as clearly illustrated in Fig. 4 of the drawing.

In use of the device the upper surface pad serves as a crushing surface for beefsteak, for the chopping of vegetables, for the rolling of dough, or for any other use. By constructing the pad 19 of rubber or other yieldable material the noise incident to crushing, pounding or chopping operations is deadened, in addition to providing a surface which will in no way tend to dull sharp cutting instruments employed in chopping or cutting operations. It will also be seen that a storage cabinet or space 15 is defined beneath the top 12 which by placing a pan of ice therein will serve as a refrigerator or cold storage space. The cover when opened and supported by the hinged leg 28 may be used as a receptacle for water or other liquids in the preparation of food or washing of the utensils or implements used in connection therewith. It is of course understood that when the cover 25 is closed, articles may be stored and protected thereberneath from dust, dirt or insects. In addition to its utility the device will present a neat and attractive adjunct to the kitchen as the wall 10 and cover 25, as well as the ring or annulus 20 will be enameled or finished in white whereby the same may be readily cleaned.

I claim:

1. An article of kitchen furniture, comprising a cylindrical body supported on legs and provided with a relatively thick top having a reduced and centrally recessed portion projecting above the upper edge of the body, said top being spaced from the bottom of the body and forming the whole of the interior of the body into a storage chamber, said body having a door, a chopping board secured in the recess of the top of the body, a cover of inverted cup-shape hinged to the body and adapted to close over the underside portion of the top of the body and the chopping board and forming therewith a storage chamber, said cover being provided with a hinged leg.

2. In kitchen furniture comprising a body including a cylindrical vertical wall, a bottom wall secured within the lower end thereof, depending supporting legs, a top wall fitted within the upper end and having an upwardly projecting portion of reduced diameter with a central recess in its upper face, and a resilient yieldable pad secured within said recess to constitute a crushing, chopping or pounding surface for deadening the sound of such operations.

3. In kitchen furniture, a hollow cylindrical body having its top of reduced diameter provided with a concentric recess in its upper face, a resilient pad mounted within the recess, an annular element fitting up over the reduced upper end and having an inwardly projecting flange engaging the pad for retaining the same in the recess, securing means passing through the annular element and anchored in the body and a hinged cover fitting over the reduced upper end.

4. As a new article of kitchen furniture, a hollow cylindrical body having a side opening and a door hinged adjacent thereto for closing the same, a chopping pad mounted on the top of said body, a hinged cover fitting over the reduced upper end of the body, said hinged cover being of inverted cup-shaped formation, and a folding leg attached thereto constituting together with the hinged means for supporting the cover when opened in a horizontal position to afford a receptacle contiguous to the body.

ROBERT B. ELISON.